United States Patent
Huang

(10) Patent No.: US 12,055,815 B1
(45) Date of Patent: Aug. 6, 2024

(54) DISPLAY SYSTEM AND LENS ASSEMBLY FOR ELIMINATING COLOR DISPERSION THEREOF

(71) Applicant: INTERFACE ADVANCED TECHNOLOGY (CHENGDU) CO., LTD., Chengdu (CN)

(72) Inventor: Shang Yu Huang, Shenzhen (CN)

(73) Assignee: Interface Advanced Technology (Chengdu) Co., Ltd., Chengdu (CN)

( * ) Notice: Subject to any disclaimer, the term of this patent is extended or adjusted under 35 U.S.C. 154(b) by 42 days.

(21) Appl. No.: 18/185,038

(22) Filed: Mar. 16, 2023

(30) Foreign Application Priority Data

Jan. 18, 2023 (CN) .......................... 202310081653.6

(51) Int. Cl.
*G02F 1/1335* (2006.01)
*G02F 1/13357* (2006.01)
*G02F 1/13363* (2006.01)

(52) U.S. Cl.
CPC .. *G02F 1/133607* (2021.01); *G02F 1/133526* (2013.01); *G02F 1/133541* (2021.01); *G02F 1/133603* (2013.01); *G02F 1/133637* (2021.01)

(58) Field of Classification Search
CPC ......... G02F 1/133607; G02F 1/133526; G02F 1/133541; G02F 1/133603; G02F 1/133637
USPC ...................................... 349/13–14, 95, 200
See application file for complete search history.

(56) References Cited

U.S. PATENT DOCUMENTS

2018/0039052 A1\* 2/2018 Khan .................... G09G 3/003

\* cited by examiner

*Primary Examiner* — Charles S Chang
(74) *Attorney, Agent, or Firm* — Rosenberg, Klein & Lee

(57) ABSTRACT

A display system and a lens assembly for eliminating color dispersion thereof is disclosed. The lens assembly includes a first concave lens, a circular polarizer, and a magnifying convex lens assembly. The first concave lens has a light-receiving surface and a concave surface opposite to each other. The light-receiving surface is a plane or a convex surface. The circular polarizer may be arranged on the concave surface of the first concave lens to have a curved shape corresponding to the concave surface. The magnifying convex lens assembly is arranged on the circular polarizer through an optical adhesive. The first concave lens, the circular polarizer, and the magnifying convex lens assembly are sequentially arranged along an optical axis. When the light-receiving surface is a convex surface, the circular polarizer is arranged on the light-receiving surface to have a curved surface corresponding to the convex surface.

22 Claims, 9 Drawing Sheets
(3 of 9 Drawing Sheet(s) Filed in Color)

DISPLAY SYSTEM AND LENS ASSEMBLY FOR ELIMINATING COLOR DISPERSION THEREOF

This application claims priority for the CN patent application no. 202310081653.6 filed on 18 Jan. 2023, the content of which is incorporated by reference in its entirely.

BACKGROUND OF THE INVENTION

Field of the Invention

The present invention relates to display technology, particularly to a display system and a lens assembly for eliminating color dispersion thereof.

Description of the Related Art

The Pancake optical design, based on the principle of polarized light, utilizes a reflecting polarizer for selectively reflecting and projecting different polarized light to cooperate with a quarter retarder (e.g., quarter waveplate), thereby adjusting the form of polarized light and reflecting the light back and forth between the half-mirror lens and the reflective polarizer. Finally, the light exits from the reflective polarizer. Circularly polarized light becomes linearly polarized after passing through a quarter retarder and then reaches the reflective polarizer. The reflective polarizer reflects the linearly polarized light. Then, the linearly polarized light passes through the quarter retarder for the second time to become circularly polarized. Then, the circularly polarized light is reflected by the half-mirror lens. When the circularly polarized light passes through the quarter retarder for the third time, it becomes linearly polarized again. Because the light after passing through the quarter retarder for the third time is rotated by 90° compared to the light after passing through the quarter retarder for the first time, the imaging can be completed through the reflective polarizer.

The Pancake design is implemented with a lens assembly. The focal length of the lens assembly can usually be adjusted by changing the position of one of the lenses. When a myopic user wore a virtual reality (VR) head-mounted display in the past, its focal length was mostly adjusted by replacing the lens. Nevertheless, the try-on process is troublesome and the selection of the focal length is relatively limited. When the optical design is upgraded to the Pancake design, there are more and more convenient options for adjusting the focal length. The Pancake design generally employs a combination of multiple lenses. In order to satisfy requirements for adjusting the focal length, the refractive index of the entire optical module can be adjusted by moving one of the lenses. This method cannot be applied to the traditional lenses and the Fresnel lenses. However, because the color dispersion is related to the wavelength of light, the traditional lenses, the Fresnel lenses and the Pancake lens assembly all have color dispersion. The focal length of the lens varies with the wavelength of the light to cause longitudinal dispersion. The magnification of the lens, related to the wavelength of the light, results in transverse dispersion. Therefore, the color dispersion of the lens cannot be completely eliminated.

To overcome the abovementioned problems, the present invention provides a display system and a lens assembly for eliminating color dispersion thereof, so as to solve the afore-mentioned problems of the prior art.

SUMMARY OF THE INVENTION

The present invention provides a display system and a lens assembly for eliminating color dispersion thereof, which improve the lateral chromatic aberration.

The present invention provides a lens assembly for eliminating color dispersion, which includes a first concave lens, a circular polarizer, and a magnifying convex lens assembly. The first concave lens has a light-receiving surface and a concave surface. The light-receiving surface and the concave surface are opposite to each other. The light-receiving surface is a plane or a convex surface. The circular polarizer is arranged on the concave surface of the first concave lens. The circular polarizer has a curved shape corresponding to the concave surface. The magnifying convex lens assembly is arranged on the circular polarizer through an optical adhesive. The first concave lens, the circular polarizer, and the magnifying convex lens assembly are sequentially arranged along an optical axis.

In an embodiment of the present invention, the circular polarizer includes a first linear polarizer and a first quarter waveplate. The first linear polarizer and the first quarter waveplate are sequentially stacked on the concave surface of the first concave lens. The first linear polarizer and the first quarter waveplate have curved shapes corresponding to the concave surface. The magnifying convex lens assembly is arranged on the first quarter waveplate through the optical adhesive. The first concave lens, the first linear polarizer, the first quarter waveplate, and the magnifying convex lens assembly are sequentially arranged along the optical axis.

In an embodiment of the present invention, the magnifying convex lens assembly includes a first convex lens, a second quarter waveplate, a reflective polarizer, a second linear polarizer, and a second convex lens. The first convex lens has a concave surface and a convex surface opposite to each other. The convex surface of the first convex lens is provided with a half mirror lens thereon. The convex surface of the first convex lens is arranged on the first quarter waveplate through the optical adhesive and the half mirror lens. The second quarter waveplate, the reflective polarizer and the second linear polarizer are sequentially stacked on the concave surface of the first convex lens. The second quarter waveplate, the reflective polarizer, and the second linear polarizer have curved shapes corresponding to the concave surface of the first convex lens. The second convex lens has a concave surface and a convex surface opposite to each other. The convex surface of the second convex lens is arranged on the second linear polarizer through an optical adhesive. The half mirror lens, the first convex lens, the second quarter waveplate, the reflective polarizer, the second linear polarizer, and the second convex lens are sequentially arranged along the optical axis.

In an embodiment of the present invention, the light-receiving surface of the first concave lens is further provided with an anti-reflection layer.

In an embodiment of the present invention, the light-receiving surface of the first concave lens faces toward the display surface of a display module. The display module is located within the total effective focal length of the first concave lens, the circular polarizer, and the magnifying convex lens assembly. The display module is configured to emit non-polarized light to the light-receiving surface of the first concave lens.

In an embodiment of the present invention, the display module is a liquid-crystal-on-silicon display module, a digital light processing module or a micro light-emitting diode display module.

In an embodiment of the present invention, a lens assembly for eliminating color dispersion includes a first concave lens, a circular polarizer, and a magnifying convex lens assembly. The first concave lens has a light-receiving surface and a concave surface. The light-receiving surface and the concave surface are opposite to each other. The light-receiving surface is a plane or a convex surface. The circular polarizer is arranged on the light-receiving surface of the first concave lens. When the light-receiving surface is the convex surface, the circular polarizer has a curved shape corresponding to the convex surface. The magnifying convex lens assembly is arranged on the concave surface of the first concave lens through an optical adhesive. The circular polarizer, the first concave lens, and the magnifying convex lens assembly are sequentially arranged along an optical axis.

In an embodiment of the present invention, a display system includes a first concave lens, a circular polarizer, a magnifying convex lens assembly and a display module. The first concave lens has a light-receiving surface and a concave surface. The light-receiving surface and the concave surface are opposite to each other. The light-receiving surface is a plane or a convex surface. The circular polarizer is arranged on the light-receiving surface of the first concave lens. When the light-receiving surface is the convex surface, the circular polarizer has a curved shape corresponding to the convex surface. The magnifying convex lens assembly is arranged on the concave surface of the first concave lens through an optical adhesive. The circular polarizer, the first concave lens, and the magnifying convex lens assembly are sequentially arranged along an optical axis. The display surface of the display module faces toward the circular polarizer. The display module is located within the total effective focal length of the circular polarizer, the first concave lens, and the magnifying convex lens assembly and configured to emit non-polarized light to the circular polarizer.

In an embodiment of the present invention, the circular polarizer includes a first linear polarizer and a first quarter waveplate. The first quarter waveplate and the first linear polarizer are sequentially stacked on the light-receiving surface of the first concave lens. When the light-receiving surface is the convex surface, the first linear polarizer and the first quarter waveplate have curved shapes corresponding to the convex surface. The first linear polarizer, the first quarter waveplate, the first concave lens, and the magnifying convex lens assembly are sequentially arranged along the optical axis.

In an embodiment of the present invention, the magnifying convex lens assembly includes a first convex lens, a second quarter waveplate, a reflective polarizer, a second linear polarizer, and a second convex lens. The first convex lens has a concave surface and a convex surface opposite to each other. The convex surface of the first convex lens is provided with a half mirror lens thereon. The convex surface of the first convex lens is arranged on the concave surface of the first concave lens through the optical adhesive and the half mirror lens. The second quarter waveplate, the reflective polarizer, and the second linear polarizer are sequentially stacked on the concave surface of the first convex lens. The second quarter waveplate, the reflective polarizer, and the second linear polarizer have curved shapes corresponding to the concave surface of the first convex lens. The second convex lens has a concave surface and a convex surface opposite to each other. The convex surface of the second convex lens is arranged on the second linear polarizer through an optical adhesive. The half mirror lens, the first convex lens, and the second quarter waveplate, the reflective polarizer, the second linear polarizer, and the second convex lens are sequentially arranged along the optical axis.

In an embodiment of the present invention, the light-receiving surface of the first concave lens and the circular polarizer are provided with an anti-reflection layer therebetween.

In an embodiment of the present invention, the display module is a liquid-crystal-on-silicon display module, a digital light processing module or a micro light-emitting diode display module.

To sum up, the display system and the lens assembly for eliminating color dispersion thereof combine the concave lens and the magnifying convex lens assembly to improve the lateral chromatic aberration due to a fact that the different locations of the concave surface of the concave lens have different curvatures and different magnifications.

Below, the embodiments are described in detail in cooperation with the drawings to make easily understood the technical contents, characteristics and accomplishments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 2:
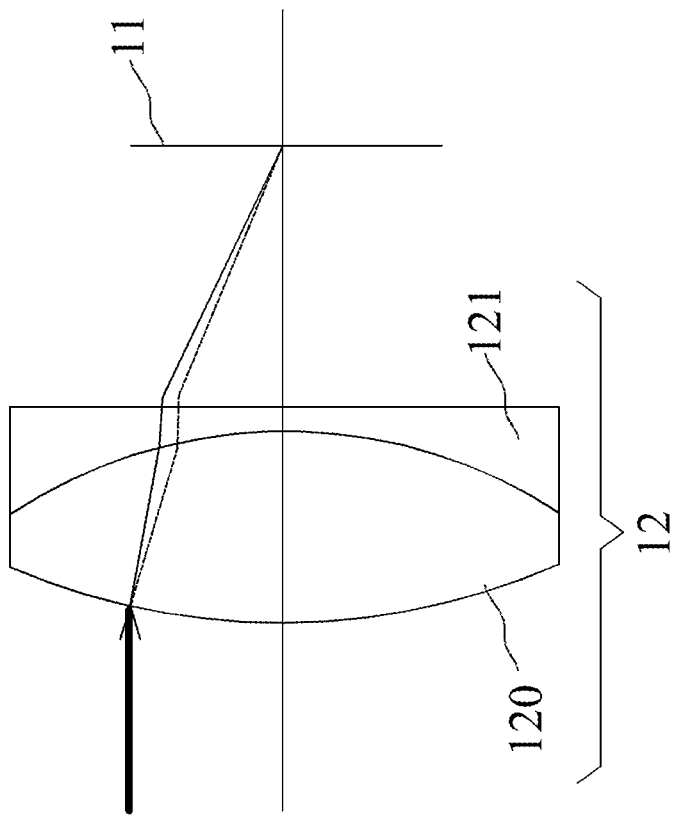
FIG. 2 is a schematic diagram illustrating the achromatic phenomenon of an achromatic lens according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

When an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Furthermore, it can be understood that the terms "comprising," "including," "having," "containing," and "involving" are open-ended terms, which refer to "may include but is not limited to so." In addition, each of the embodiments or claims of the present invention is not necessary to achieve all the effects and advantages possibly to be generated, and the abstract and title of the present invention is used to assist for patent search and is not used to further limit the claimed scope of the present invention.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

In the following description, a display system and a lens assembly for eliminating color dispersion thereof will be described, which combine a concave lens and a magnifying convex lens assembly to improve the lateral chromatic aberration due to a fact that the different locations of the concave surface of the concave lens have different curvatures and different magnifications.

Figure 1:
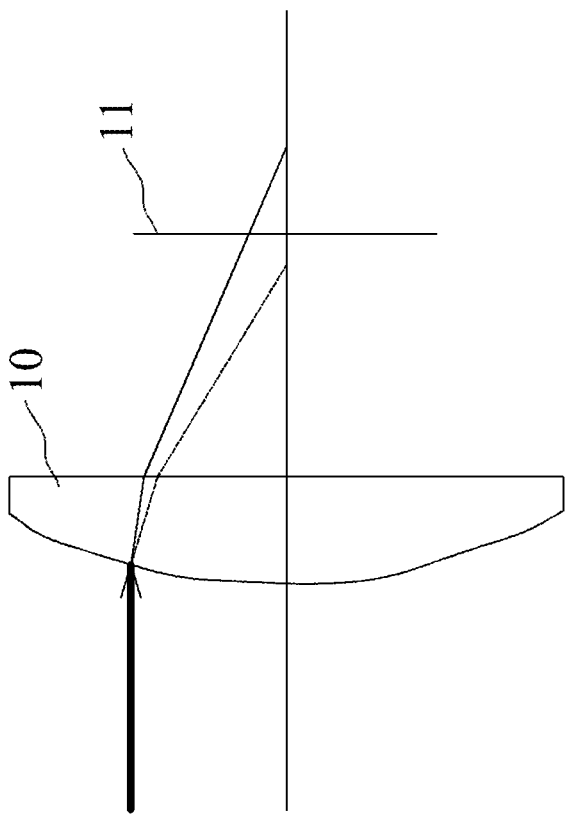
FIG. 1 is a schematic diagram illustrating the chromatic aberration of a lens.

FIG. 1 is a schematic diagram illustrating the chromatic aberration of a lens. Referring to FIG. 1, a general lens 10 has different refractive indices for different colored lights. As illustrated in FIG. 1, the red light is represented with a solid line and the blue light is represented with a dashed line. When the white light represented with a thick line enters the lens 10, the lens 10 separates the blue light from the red light because the blue light and the red light correspond to different refractive indices. When the blue light and the red light radiate from the lens 10 to an image plane 11, a blue area and a red area will be formed in different areas of the image plane 11 to cause color dispersion or chromatic aberration. FIG. 2 is a schematic diagram illustrating the achromatic phenomenon of an achromatic lens according to an embodiment of the present invention. Referring to FIG. 2, an achromatic lens 12 includes a convex lens 120 and a concave lens 121 bonded to each other. The convex lens 120 and the concave lens 121 have different optical properties and include glass. In addition, red light is represented with a solid line, and blue light is represented with a dashed line. When the white light represented with a thick line enters the achromatic lens 12, the achromatic lens 12 also slightly separates the blue light from the red light. The convex lens 120 and the concave lens 121 have different optical properties. As a result, when the blue light and the red light are emitted from the achromatic lens 12, the blue light and the red light will be emitted to the same area of the image plane 11 to avoid color dispersion or chromatic aberration. Considering photochemistry, the achromatic lens 12 can eliminate the chromatic aberration of the yellow light with a wavelength of 589.3 nm and the violet light with a wavelength of 430.8 nm.

Figure 3:
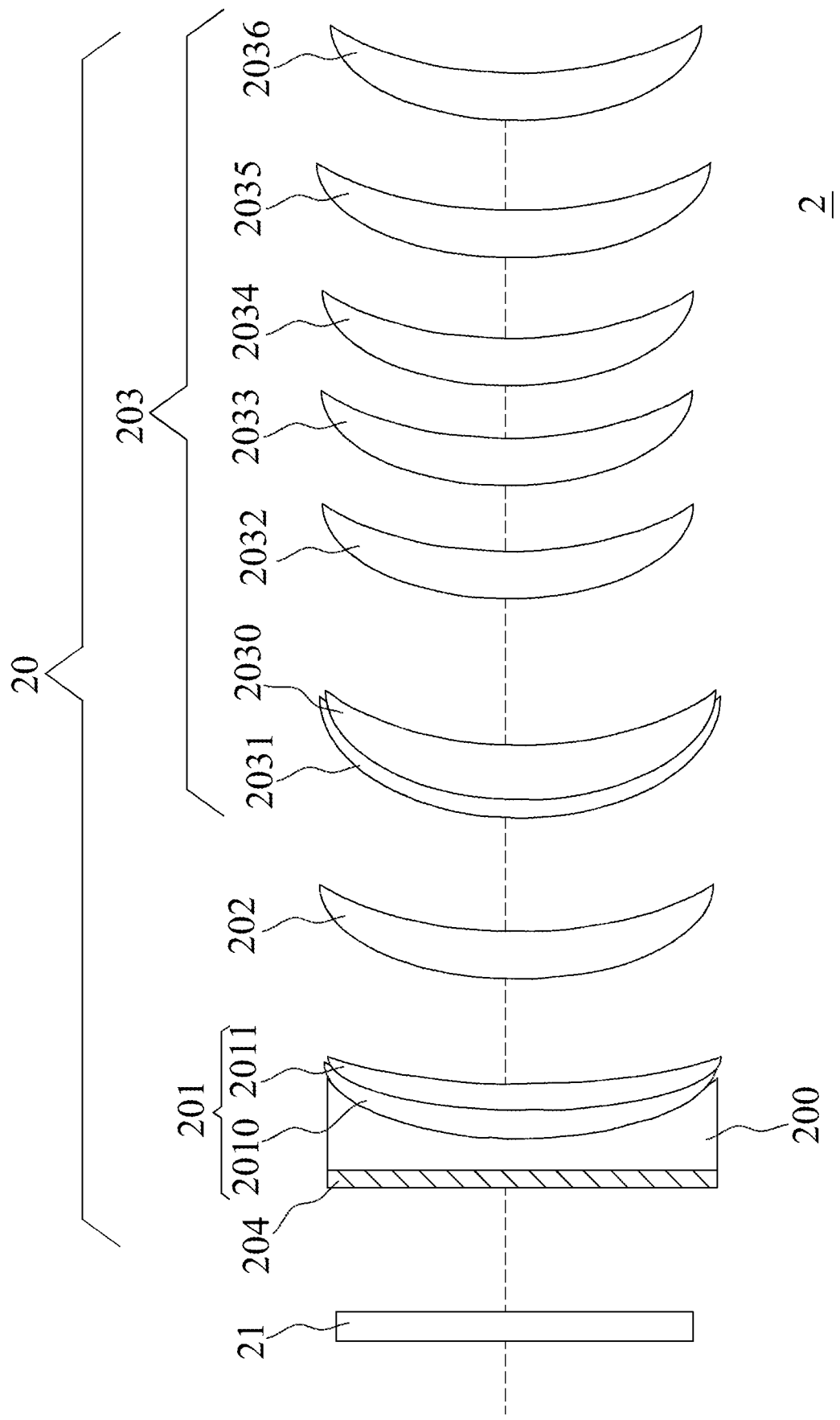
FIG. 3 is a schematic diagram illustrating a display system according to a first embodiment of the present invention.

FIG. 3 is a schematic diagram illustrating a display system according to a first embodiment of the present invention. Referring to FIG. 3, the first embodiment of a display system 2 is introduced as follows. The display system 2 includes a lens assembly 20 for eliminating color dispersion and a display module 21. The display module 21 may be, but not limited to, a liquid-crystal-on-silicon display module, a digital light processing module or a micro light-emitting diode display module. The lens assembly 20 for eliminating color dispersion includes a first concave lens 200, a circular polarizer 201, an optical adhesive 202, and a magnifying convex lens assembly 203. The optical adhesive 202 can be, but not limited to, a liquid optical clear adhesive (LOCA). The first concave lens 200 has a light-receiving surface and a concave surface, wherein the light-receiving surface and the concave surface are opposite to each other. The first embodiment exemplifies the light-receiving surface with a plane, such that the first concave lens 200 is a plano-concave lens. The circular polarizer 201 is arranged on the concave surface of the first concave lens 200, wherein the circular polarizer 201 has a curved shape corresponding to the concave surface. The magnifying convex lens assembly 203 is arranged on the circular polarizer 201 through the optical adhesive 202. The first concave lens 200, the circular polarizer 201, and the magnifying convex lens assembly 203 are sequentially arranged along an optical axis, wherein the optical axis is represented with a dashed line. The circular polarizer 201 has a curved shape corresponding to the concave surface to prevent from light leakage caused by the axial misalignment between the circular polarizer 201 and the magnifying convex lens assembly 203, thereby improving the imaging aberration and chromatic aberration. The display surface of the display module 21 faces toward the light-receiving surface of the first concave lens 200. The display module 21 does not include any polarizer. The display module 21 emits non-polarized light to the light-receiving surface of the first concave lens 200. The display module 21, located within the total effective focal length of the first concave lens 200, the circular polarizer 201, and the magnifying convex lens assembly 203, is configured to form a magnified virtual image. Since the different positions of the concave surface of the first concave lens 200 have different curvatures and different magnifications, and the first concave lens 200 is combined with the magnifying convex lens assembly 203, the lens assembly 20 can improve the lateral chromatic aberration. In addition, in order to improve the imaging effect, the lens assembly 20 may further include an anti-reflection layer 204 arranged on the light-receiving surface of the first concave lens 200.

In some embodiments of the present invention, the circular polarizer 201 may include, but is not limited to, a first linear polarizer 2010 and a first quarter waveplate 2011. The first linear polarizer 2010 and the first quarter waveplate 2011 are sequentially stacked on the concave surface of the first concave lens 200. The first linear polarizer 2010 and the first quarter waveplate 2011 have curved shapes corresponding to the concave surface of the first concave lens 200. The magnifying convex lens assembly 203 is arranged on the first quarter waveplate 2011 through the optical adhesive 202. The first concave lens 200, the first linear polarizer 2010, the first quarter waveplate 2011, and the magnifying convex lens assembly 203 are sequentially arranged along the optical axis.

The magnifying convex lens assembly 203 may include, but is not limited to, a first convex lens 2030, a half mirror lens 2031, a second quarter waveplate 2032, a reflective polarizer 2033, a second linear polarizer 2034, an optical adhesive 2035, and a second convex lens 2036. The optical adhesive 2035 may be, but not limited to a LOCA. The first convex lens 2030 has a concave surface and a convex surface opposite to each other. The convex surface of the first convex lens 2030 is provided with the half mirror lens 2031 thereon. The convex surface of the first convex lens 2030 is arranged on the first quarter waveplate 2011 through the optical adhesive 202 and the half mirror lens 2031. The second quarter waveplate 2032, the reflective polarizer 2033, and the second linear polarizer 2034 are sequentially stacked on the concave surface of the first convex lens 2030. The second quarter waveplate 2032, the reflective polarizer 2033, and the second linear polarizer 2034 have curved shapes corresponding to the concave surface of the first convex lens 2030. The first quarter waveplate 2011 has a curved surface corresponding to the concave surface of the first concave lens 200 to prevent from light leakage caused by the axial misalignment between the first quarter waveplate 2011 and the second quarter waveplate 2032, thereby improving the imaging aberration and chromatic aberration. The second convex lens 2036 has a concave surface and a convex surface opposite to each other. The convex surface of the second convex lens 2036 is arranged on the second linear polarizer 2034 through the optical adhesive 2035. The half mirror lens 2031, the first convex lens 2030, the second quarter waveplate 2032, the reflective polarizer 2033, the second linear polarizer 2034, and the second convex lens 2036 are sequentially arranged along the optical axis.

Figure 4:
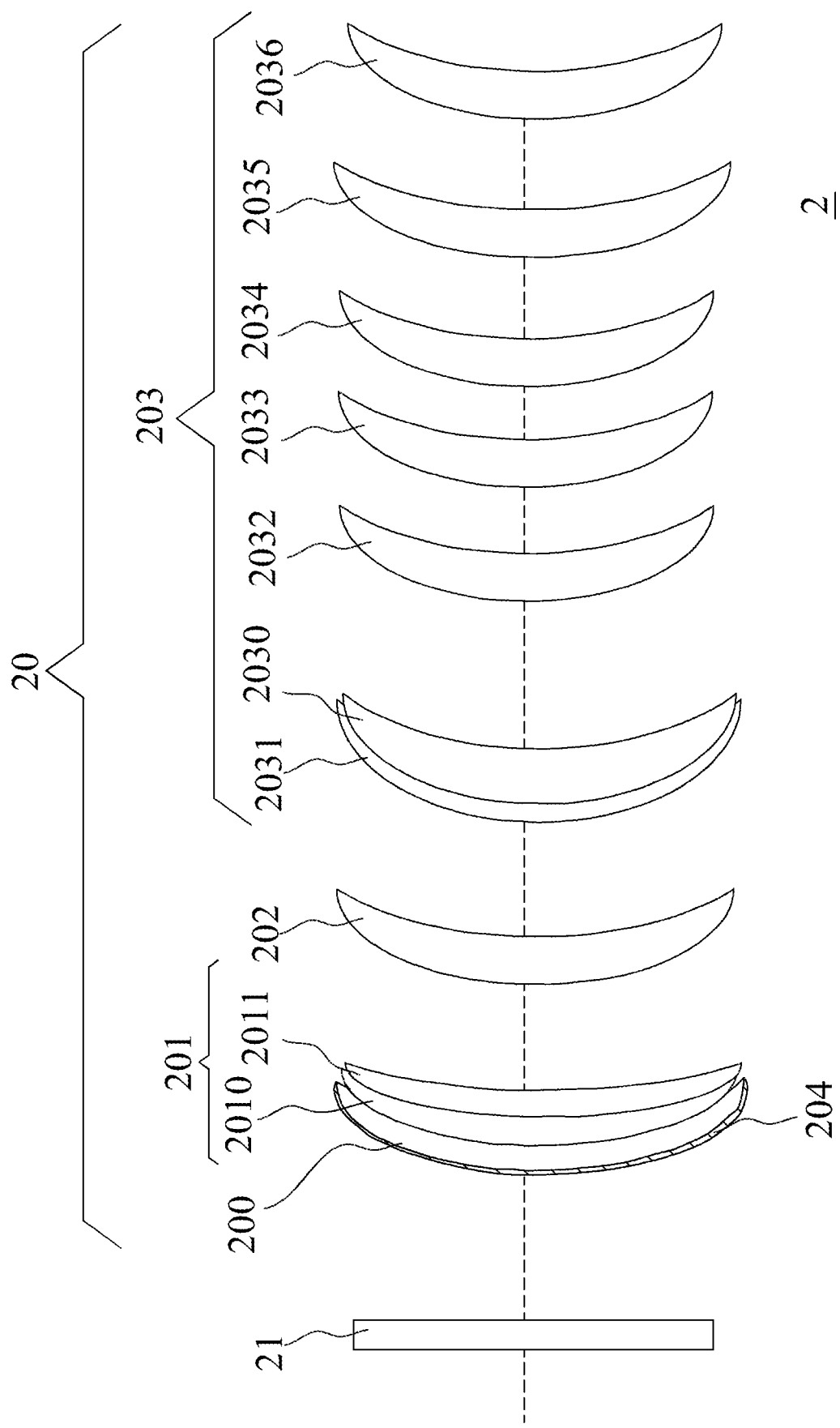
FIG. 4 is a schematic diagram illustrating a display system according to a second embodiment of the present invention.

FIG. 4 is a schematic diagram illustrating a display system according to a second embodiment of the present invention. Referring to FIG. 4, the second embodiment of the display system 2 is introduced as follows. The second embodiment is different from the first embodiment in the first concave lens 200. In the second embodiment, the first concave lens 200 is a convex-concave lens, and the light-receiving surface of the first concave lens 200 is a convex surface. The curvature of the concave surface of the first concave lens 200 is greater than the curvature of the convex surface of the first concave lens 200. The other components of the second embodiment have been previously described in the first embodiment so they will not be reiterated.

Figure 5:
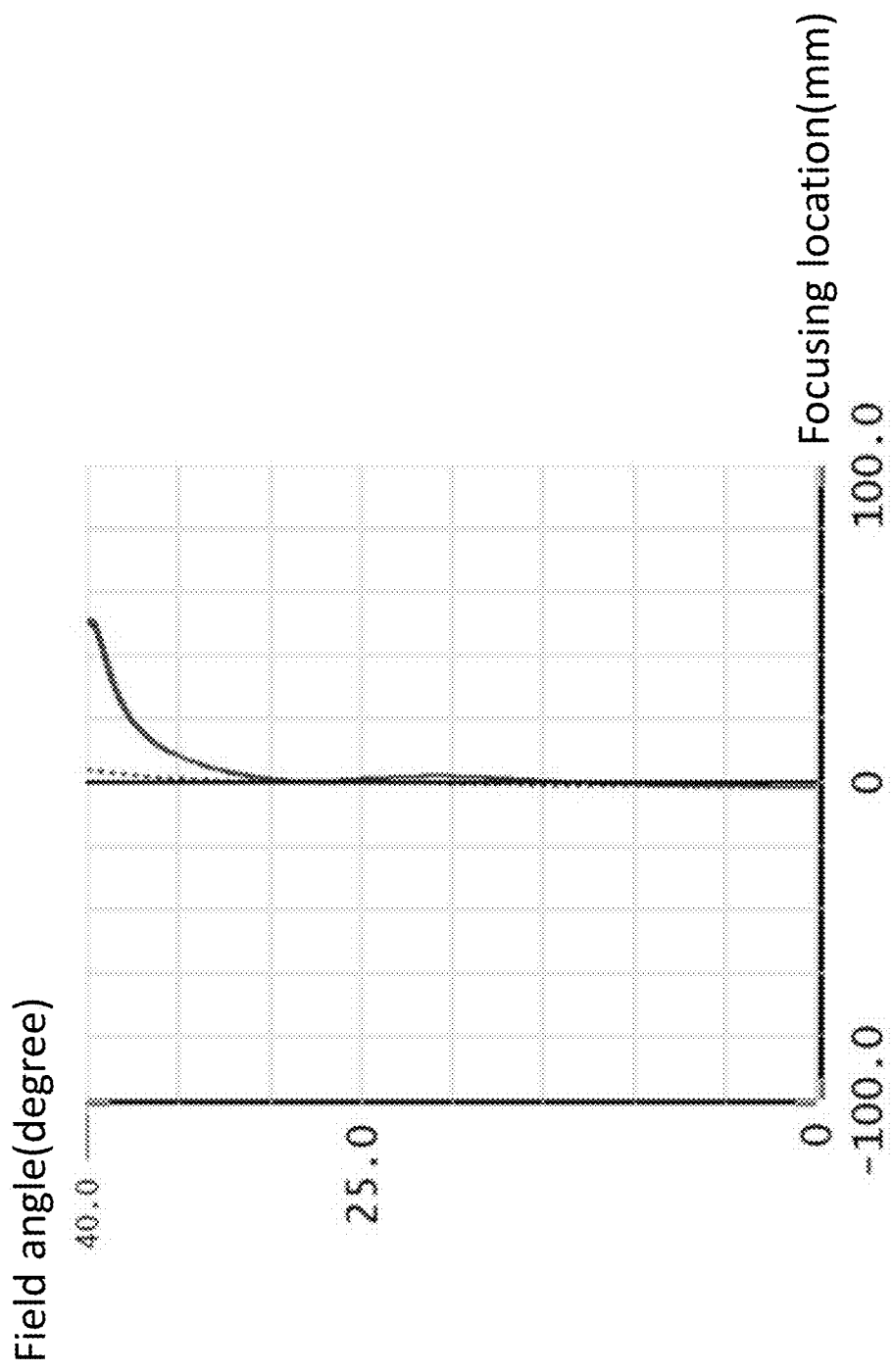
FIG. 5 is a schematic diagram illustrating the field curvatures of red, blue, and green light in the Tangential and Sagittal directions according to the second embodiment of the present invention.
Figure 6:
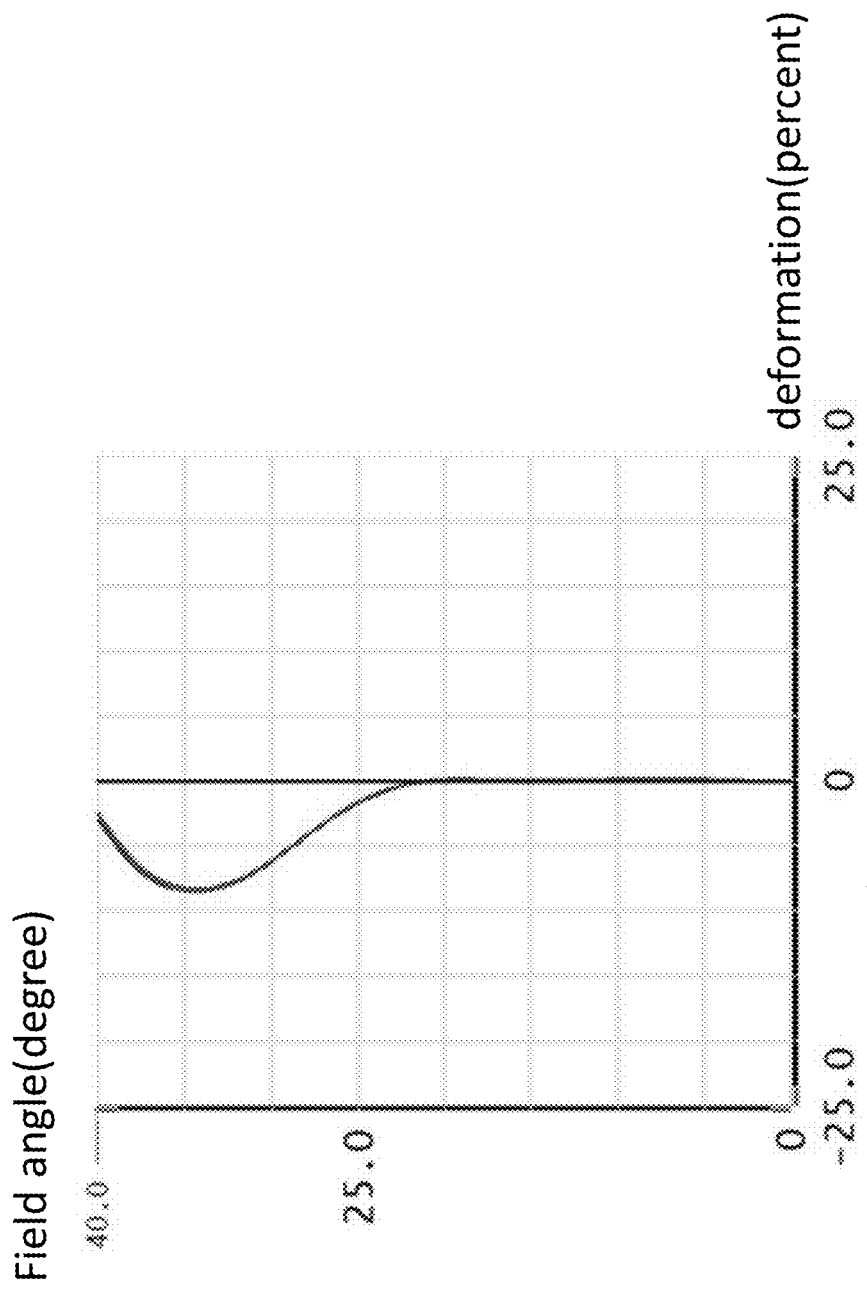
FIG. 6 is a schematic diagram illustrating the deformation of the red, blue, and green light according to the second embodiment of the present invention.

FIG. 5 is a schematic diagram illustrating the field curvatures of red, blue, and green light in the Tangential and Sagittal directions according to the second embodiment of the present invention. FIG. 6 is a schematic diagram illustrating the deformation of the red, blue, and green light according to the second embodiment of the present invention. As illustrated in FIG. 5, a dashed line represents the Sagittal direction and a solid line represent the Tangential direction. As illustrated in FIG. 5 and FIG. 6, red, blue, and green colors respectively represent red, blue, and green light. From FIG. 5 and FIG. 6, it can be seen that the imaging aberration of the second embodiment of the display system is controlled within a reasonable range to guarantee the imaging quality.

Figure 7:
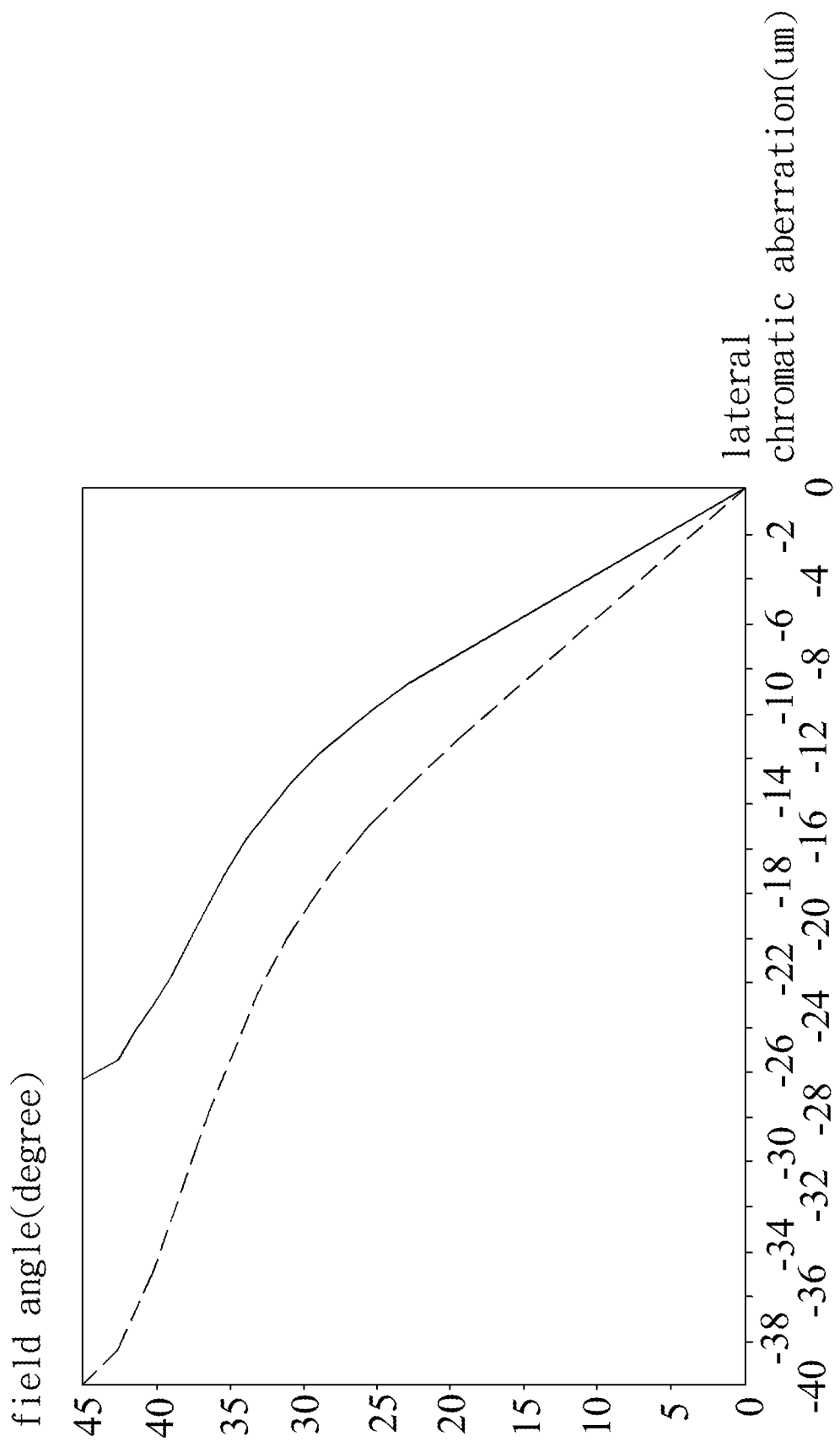
FIG. 7 is a schematic diagram illustrating the field angle and the lateral chromatic aberration of the red, blue, and green light according to the second embodiment of the present invention.
Figure 8:
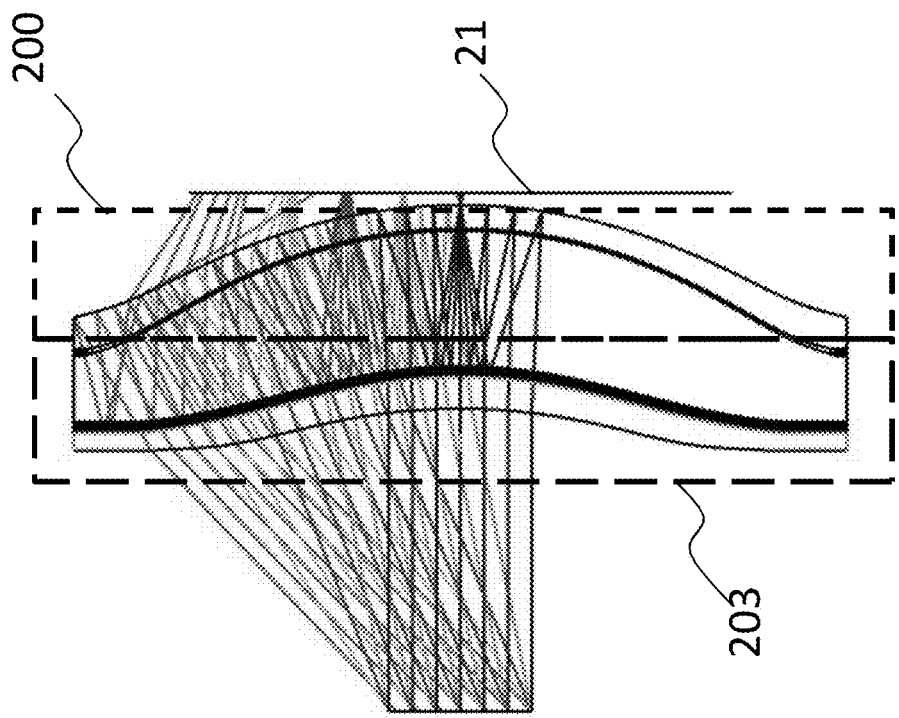
FIG. 8 is a schematic diagram illustrating the achromatic phenomenon of a display system according to the first embodiment of the present invention.

FIG. 7 is a schematic diagram illustrating the field angle and the lateral chromatic aberration of the red, blue, and green light according to the second embodiment of the present invention. As illustrated in FIG. 7, a solid line and a dashed line respectively represent red light and blue light. When the magnifying convex lens assembly of the present invention has a field angle of 40 degrees, the lateral chromatic aberrations of the blue light and red light are respectively −100 μm and −42 μm. In other words, the second embodiment of the display system has a less lateral chromatic aberration than the magnifying convex lens assembly. FIG. 8 is a schematic diagram illustrating the achromatic phenomenon of a display system according to the first embodiment of the present invention. As illustrated in FIG. 8, different color lines respectively represent different colored lights. When the display module 21 and the magnifying convex lens assembly 203 emits non-polarized light represented with different color lines to the first concave lens 200, the lateral chromatic aberrations of various colored lights can be effectively reduced.

Figure 9:
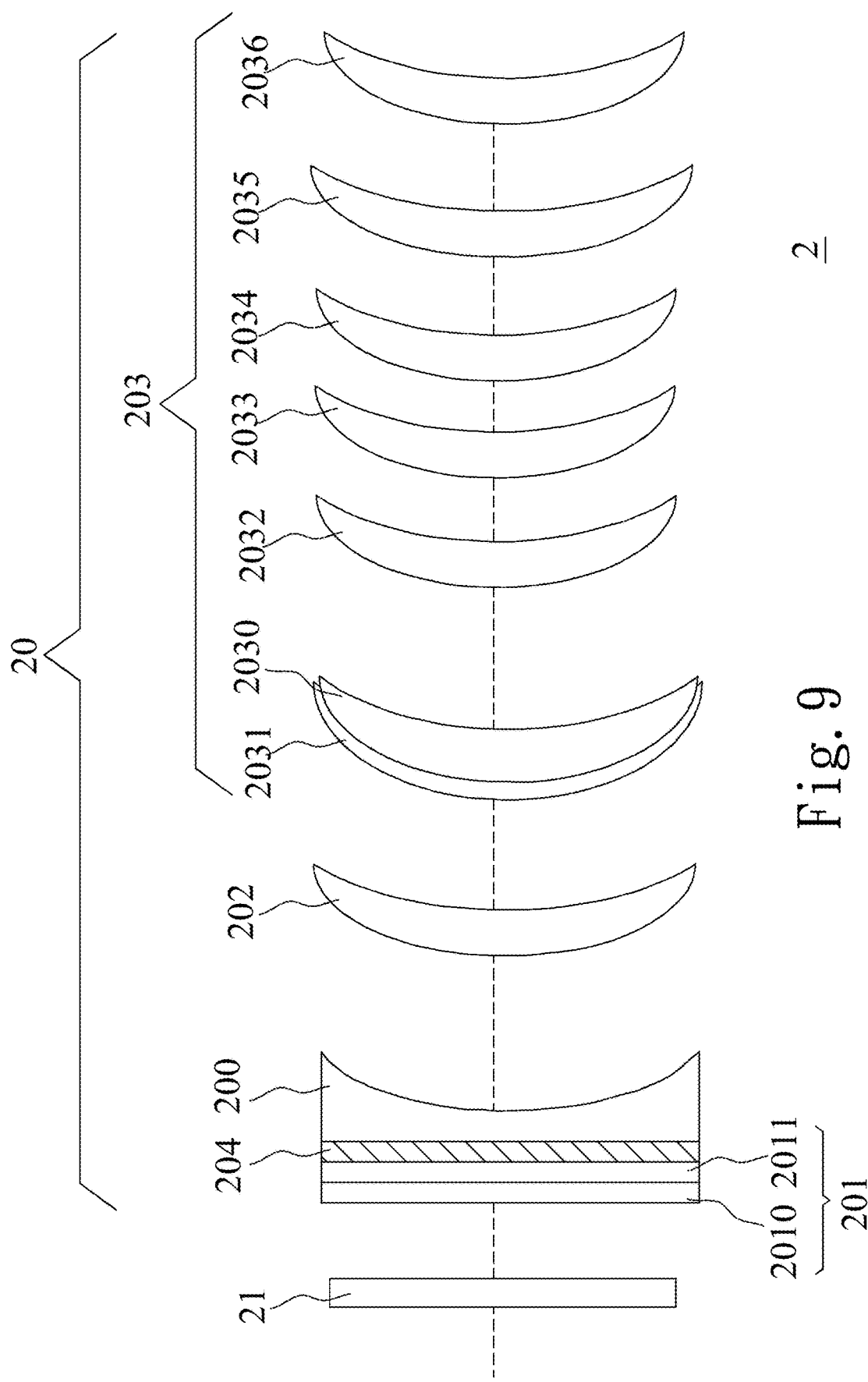
FIG. 9 is a schematic diagram illustrating a display system according to a third embodiment of the present invention.

FIG. 9 is a schematic diagram illustrating a display system according to a third embodiment of the present invention. Referring to FIG. 9, the third embodiment of the display system 2 is introduced as follows. The display system 2 includes a lens assembly 20 for eliminating color dispersion and a display module 21. The display module 21 may be, but not limited to, a liquid-crystal-on-silicon display module, a digital light processing module or a micro light-emitting diode display module. The lens assembly 20 includes a first concave lens 200, a circular polarizer 201, an optical adhesive 202, and a magnifying convex lens assembly 203. The optical adhesive 202 may be, but not limited to a LOCA. The first concave lens 200 has a light-receiving surface and a concave surface, wherein the light-receiving surface and the concave surface are opposite to each other. The third embodiment exemplifies the light-receiving surface with a plane such that the first concave lens 200 is a plano-concave lens. The circular polarizer 201 is arranged on the light-receiving surface of the first concave lens 200. The magnifying convex lens assembly 203 is arranged on the concave surface of the first concave lens 200 through the optical adhesive 202. The circular polarizer 201, the first concave lens 200, and the magnifying convex lens assembly 203 are sequentially arranged along an optical axis. The optical axis is represented with a dashed line. The display surface of the display module 21 faces toward the circular polarizer 201. The display module 21 does not include any polarizer. The display module 21 emits non-polarized light to the circular polarizer 201. The display module 21, located within the total effective focal length of the circular polarizer 201, the first concave lens 200, and the magnifying convex lens assembly 203, is configured to form a magnified virtual image. Since the different positions of the concave surface of the first concave lens 200 have different curvatures and different magnifications, and the first concave lens 200 is combined with the magnifying convex lens assembly 203, the lens assembly 20 can improve the lateral chromatic aberration. In addition, in order to improve the imaging effect, the lens assembly 20 may further include an anti-reflection layer 204 arranged between the light-receiving surface of the first concave lens 200 and the circular polarizer 201.

In some embodiments of the present invention, the circular polarizer 201 may include, but is not limited to, a first linear polarizer 2010 and a first quarter waveplate 2011. The first quarter waveplate 2011 and the first linear polarizer 2010 are sequentially stacked on the light-receiving surface of the first concave lens 200. The first quarter waveplate 2011 and the first linear polarizer 2010 have curved shapes corresponding to the concave surface of the first concave lens 200. The magnifying convex lens assembly 203 is arranged on the first quarter waveplate 2011 through the optical adhesive 202. The first linear polarizer 2010, the first quarter waveplate 2011, the first concave lens 200, and the magnifying convex lens assembly 203 are sequentially arranged along the optical axis.

The magnifying convex lens assembly 203 may include, but is not limited to, a first convex lens 2030, a half mirror lens 2031, a second quarter waveplate 2032, a reflective polarizer 2033, a second linear polarizer 2034, an optical adhesive 2035, and a second convex lens 2036. The optical adhesive 2035 may be, but not limited to, a LOCA. The first convex lens 2030 has a concave surface and a convex surface opposite to each other. The convex surface of the first convex lens 2030 is provided with the half mirror lens 2031 thereon. The convex surface of the first convex lens 2030 is arranged on the concave surface of the first concave lens 200 through the optical adhesive 2035 and the half mirror lens 2031. The second quarter waveplate 2032, the reflective polarizer 2033, and the second linear polarizer 2034 are sequentially stacked on the concave surface of the first convex lens 2030. The second quarter waveplate 2032, the reflective polarizer 2033, and the second linear polarizer 2034 have curved shapes corresponding to the concave surface of the first convex lens 2030. The second convex lens 2036 has a concave surface and a convex surface opposite to each other. The convex surface of the second convex lens 2036 is arranged on the second linear polarizer 2034 through the optical adhesive 2035. The half mirror lens 2031, the first convex lens 2030, and the second quarter waveplate 2032, the reflective polarizer 2033, the second linear polarizer 2034, and the second convex lens 2036 are sequentially arranged along the optical axis.

Figure 10:
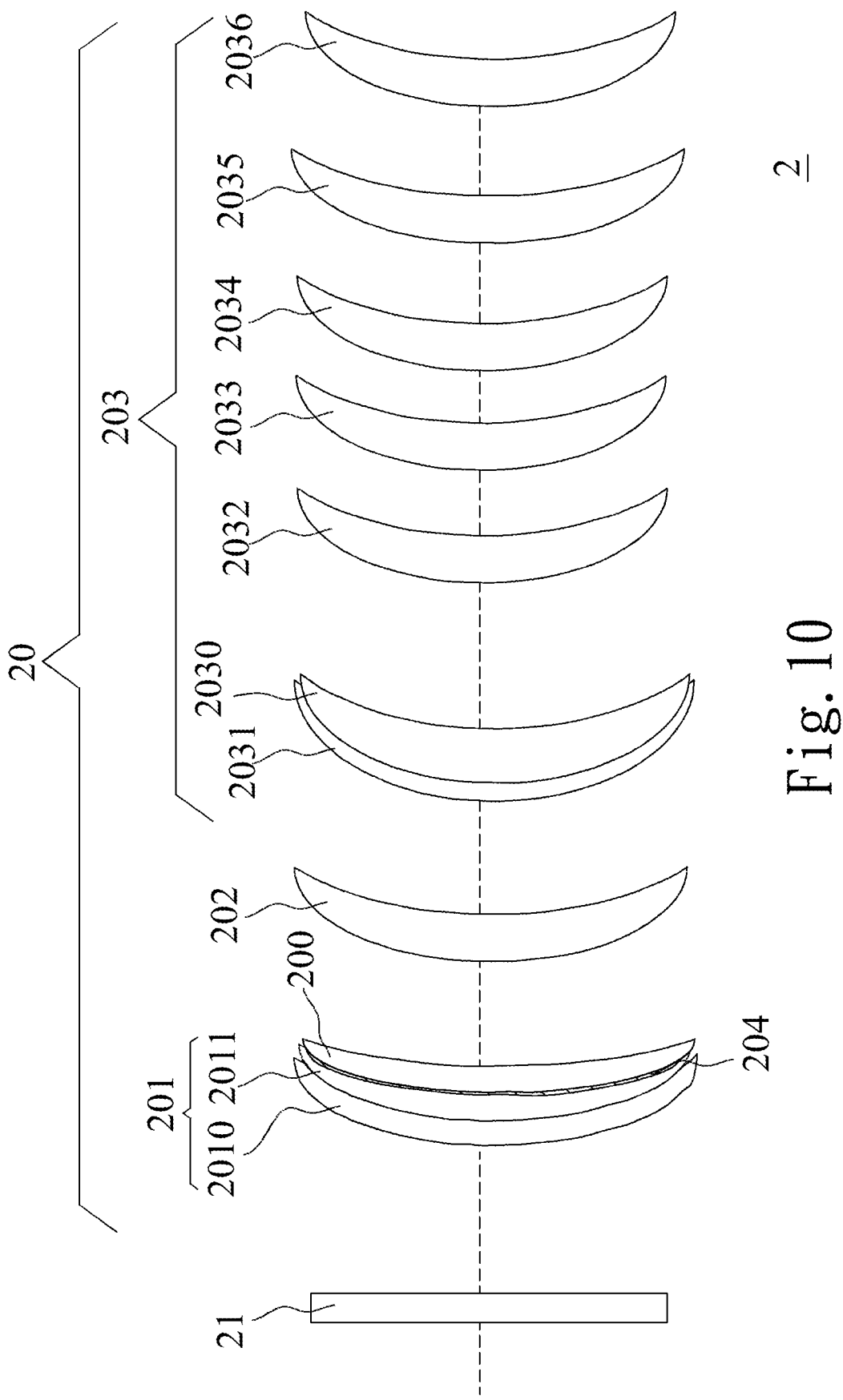
FIG. 10 is a schematic diagram illustrating a display system according to a fourth embodiment of the present invention.

FIG. 10 is a schematic diagram illustrating a display system according to a fourth embodiment of the present invention. Referring to FIG. 10, the fourth embodiment of the display system 2 is introduced as follows. The fourth embodiment is different from the third embodiment in the first concave lens 200. In the fourth embodiment, the first concave lens 200 is a convex-concave lens, and the light-receiving surface of the first concave lens 200 is a convex surface. The curvature of the concave surface of the first concave lens 200 is greater than the curvature of the convex surface of the first concave lens 200. The first linear polarizer 2010 and the first quarter waveplate 2011 of the circular polarizer 201 have curved surfaces corresponding to the convex surface of the first concave lens 200. The other components of the fourth embodiment have been previously described in the third embodiment so they will not be reiterated. The first quarter waveplate 2011 has a curved shape corresponding to the convex surface of the first concave lens 200 to prevent from light leakage caused by the axial misalignment between the first quarter waveplate 2011 and the second quarter waveplate 2032, thereby improving the imaging aberration and chromatic aberration.

According to the embodiments provided above, the display system and the lens assembly for eliminating color dispersion thereof combine the concave lens and the magnifying convex lens assembly to improve the lateral chromatic aberration due to a fact that the different locations of the concave surface of the concave lens have different curvatures and different magnifications.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A lens assembly for eliminating color dispersion comprising:
   a first concave lens having a light-receiving surface and a concave surface, wherein the light-receiving surface and the concave surface are opposite to each other, and the light-receiving surface is a plane or a convex surface;
   a circular polarizer arranged on the concave surface of the first concave lens, wherein the circular polarizer has a curved shape corresponding to the concave surface; and
   a magnifying convex lens assembly arranged on the circular polarizer through an optical adhesive, wherein the first concave lens, the circular polarizer, and the magnifying convex lens assembly are sequentially arranged along an optical axis.

2. The lens assembly for eliminating color dispersion according to claim 1, wherein the circular polarizer comprises a first linear polarizer and a first quarter waveplate, the first linear polarizer and the first quarter waveplate are sequentially stacked on the concave surface of the first concave lens, the first linear polarizer and the first quarter waveplate have curved shapes corresponding to the concave surface, the magnifying convex lens assembly is arranged on the first quarter waveplate through the optical adhesive, and the first concave lens, the first linear polarizer, the first quarter waveplate, and the magnifying convex lens assembly are sequentially arranged along the optical axis.

3. The lens assembly for eliminating color dispersion according to claim 2, wherein the magnifying convex lens assembly comprises:
   a first convex lens having a concave surface and a convex surface opposite to each other, wherein the convex surface of the first convex lens is provided with a half mirror lens thereon, and the convex surface of the first convex lens is arranged on the first quarter waveplate through the optical adhesive and the half mirror lens;
   a second quarter waveplate, a reflective polarizer and a second linear polarizer sequentially stacked on the concave surface of the first convex lens, wherein the second quarter waveplate, the reflective polarizer, and the second linear polarizer have curved shapes corresponding to the concave surface of the first convex lens; and a second convex lens having a concave surface and a convex surface opposite to each other, wherein the convex surface of the second convex lens is arranged on the second linear polarizer through an optical adhesive, and the half mirror lens, the first convex lens, the second quarter waveplate, the reflective polarizer, the second linear polarizer, and the second convex lens are sequentially arranged along the optical axis.

4. The lens assembly for eliminating color dispersion according to claim 1, wherein the light-receiving surface of the first concave lens is further provided with an anti-reflection layer.

5. The lens assembly for eliminating color dispersion according to claim 1, wherein the light-receiving surface of the first concave lens faces toward a display surface of a display module, the display module is located within a total effective focal length of the first concave lens, the circular polarizer, and the magnifying convex lens assembly, and the display module is configured to emit non-polarized light to the light-receiving surface of the first concave lens.

6. The lens assembly for eliminating color dispersion according to claim 5, wherein the display module is a liquid-crystal-on-silicon display module, a digital light processing module or a micro light-emitting diode display module.

7. A lens assembly for eliminating color dispersion comprising:
a first concave lens having a light-receiving surface and a concave surface, wherein the light-receiving surface and the concave surface are opposite to each other, and the light-receiving surface is a plane or a convex surface;
a circular polarizer arranged on the light-receiving surface of the first concave lens, wherein when the light-receiving surface is the convex surface, the circular polarizer has a curved shape corresponding to the convex surface; and
a magnifying convex lens assembly arranged on the concave surface of the first concave lens through an optical adhesive, wherein the circular polarizer, the first concave lens, and the magnifying convex lens assembly are sequentially arranged along an optical axis.

8. The lens assembly for eliminating color dispersion according to claim 7, wherein the circular polarizer comprises a first linear polarizer and a first quarter waveplate, the first quarter waveplate and the first linear polarizer are sequentially stacked on the light-receiving surface of the first concave lens, when the light-receiving surface is the convex surface, the first linear polarizer and the first quarter waveplate have curved shapes corresponding to the convex surface, and the first linear polarizer, the first quarter waveplate, the first concave lens, and the magnifying convex lens assembly are sequentially arranged along the optical axis.

9. The lens assembly for eliminating color dispersion according to claim 8, wherein the magnifying convex lens assembly comprises:
a first convex lens having a concave surface and a convex surface opposite to each other, wherein the convex surface of the first convex lens is provided with a half mirror lens thereon, and the concave surface of the first convex lens is arranged on the concave surface of the first concave lens through the optical adhesive and the half mirror lens;

a second quarter waveplate, a reflective polarizer, and a second linear polarizer sequentially stacked on the concave surface of the first convex lens, wherein the second quarter waveplate, the reflective polarizer, and the second linear polarizer have curved shapes corresponding to the concave surface of the first convex lens; and a second convex lens having a concave surface and a convex surface opposite to each other, wherein the convex surface of the second convex lens is arranged on the second linear polarizer through an optical adhesive, and the half mirror lens, the first convex lens, and the second quarter waveplate, the reflective polarizer, the second linear polarizer, and the second convex lens are sequentially arranged along the optical axis.

10. The lens assembly for eliminating color dispersion according to claim 7, wherein the light-receiving surface of the first concave lens and the circular polarizer are provided with an anti-reflection layer therebetween.

11. The lens assembly for eliminating color dispersion according to claim 7, wherein the circular polarizer faces toward a display surface of a display module, the display module is located within a total effective focal length of the circular polarizer, the first concave lens, and the magnifying convex lens assembly, and the display module is configured to emit non-polarized light to the circular polarizer.

12. The lens assembly for eliminating color dispersion according to claim 11, wherein the display module is a liquid-crystal-on-silicon display module, a digital light processing module or a micro light-emitting diode display module.

13. A display system comprising:
a first concave lens having a light-receiving surface and a concave surface, wherein the light-receiving surface and the concave surface are opposite to each other, and the light-receiving surface is a plane or a convex surface;
a circular polarizer arranged on the concave surface of the first concave lens, wherein the circular polarizer has a curved shape corresponding to the concave surface;
a magnifying convex lens assembly arranged on the circular polarizer through an optical adhesive, wherein the first concave lens, the circular polarizer, and the magnifying convex lens assembly are sequentially arranged along an optical axis; and
a display module with a display surface thereof facing toward the light-receiving surface of the first concave lens, wherein the display module is located within a total effective focal length of the first concave lens, the circular polarizer, and the magnifying convex lens assembly and configured to emit non-polarized light to the light-receiving surface of the first concave lens.

14. The display system according to claim 13, wherein the circular polarizer comprises a first linear polarizer and a first quarter waveplate, the first linear polarizer and the first quarter waveplate are sequentially stacked on the concave surface of the first concave lens, the first linear polarizer and the first quarter waveplate have curved shapes corresponding to the concave surface, the magnifying convex lens assembly is arranged on the first quarter waveplate through the optical adhesive, and the first concave lens, the first linear polarizer, the first quarter waveplate, and the magnifying convex lens assembly are sequentially arranged along the optical axis.

15. The display system according to claim 14, wherein the magnifying convex lens assembly comprises:

a first convex lens having a concave surface and a convex surface opposite to each other, wherein the convex surface of the first convex lens is provided with a half mirror lens thereon, and the convex surface of the first convex lens is arranged on the first quarter waveplate through the optical adhesive and the half mirror lens;

a second quarter waveplate, a reflective polarizer, and a second linear polarizer sequentially stacked on the concave surface of the first convex lens, wherein the second quarter waveplate, the reflective polarizer, and the second linear polarizer have curved shapes corresponding to the concave surface of the first convex lens; and a second convex lens having a concave surface and a convex surface opposite to each other, wherein the convex surface of the second convex lens is arranged on the second linear polarizer through an optical adhesive, and the half mirror lens, the first convex lens, the second quarter waveplate, the reflective polarizer, the second linear polarizer, and the second convex lens are sequentially arranged along the optical axis.

16. The display system according to claim 13, wherein the light-receiving surface of the first concave lens is further provided with an anti-reflection layer.

17. The display system according to claim 13, wherein the display module is a liquid-crystal-on-silicon display module, a digital light processing module or a micro light-emitting diode display module.

18. A display system comprising:

a first concave lens having a light-receiving surface and a concave surface, wherein the light-receiving surface and the concave surface are opposite to each other, and the light-receiving surface is a plane or a convex surface;

a circular polarizer arranged on the light-receiving surface of the first concave lens, wherein when the light-receiving surface is the convex surface, the circular polarizer has a curved shape corresponding to the convex surface;

a magnifying convex lens assembly arranged on the concave surface of the first concave lens through an optical adhesive, wherein the circular polarizer, the first concave lens, and the magnifying convex lens assembly are sequentially arranged along an optical axis; and a display module with a display surface thereof facing toward the circular polarizer, wherein the display module is located within a total effective focal length of the circular polarizer, the first concave lens, and the magnifying convex lens assembly and configured to emit non-polarized light to the circular polarizer.

19. The display system according to claim 18, wherein the circular polarizer comprises a first linear polarizer and a first quarter waveplate, the first quarter waveplate and the first linear polarizer are sequentially stacked on the light-receiving surface of the first concave lens, when the light-receiving surface is the convex surface, the first linear polarizer and the first quarter waveplate have curved shapes corresponding to the convex surface, and the first linear polarizer, the first quarter waveplate, the first concave lens, and the magnifying convex lens assembly are sequentially arranged along the optical axis.

20. The display system according to claim 19, wherein the magnifying convex lens assembly comprises:

a first convex lens having a concave surface and a convex surface opposite to each other, wherein the convex surface of the first convex lens is provided with a half mirror lens thereon, and the convex surface of the first convex lens is arranged on the concave surface of the first concave lens through the optical adhesive and the half mirror lens;

a second quarter waveplate, a reflective polarizer, and a second linear polarizer sequentially stacked on the concave surface of the first convex lens, wherein the second quarter waveplate, the reflective polarizer, and the second linear polarizer have curved shapes corresponding to the concave surface of the first convex lens; and a second convex lens having a concave surface and a convex surface opposite to each other, wherein the convex surface of the second convex lens is arranged on the second linear polarizer through an optical adhesive, and the half mirror lens, the first convex lens, the second quarter waveplate, the reflective polarizer, the second linear polarizer, and the second convex lens are sequentially arranged along the optical axis.

21. The display system according to claim 18, wherein the light-receiving surface of the first concave lens and the circular polarizer are provided with an anti-reflection layer therebetween.

22. The display system according to claim 18, wherein the display module is a liquid-crystal-on-silicon display module, a digital light processing module or a micro light-emitting diode display module.

* * * * *